United States Patent
Koktan

(10) Patent No.: US 8,924,640 B2
(45) Date of Patent: Dec. 30, 2014

(54) DYNAMIC ALLOCATION OF RECORDS TO CLUSTERS IN A TERNARY CONTENT ADDRESSABLE MEMORY

(75) Inventor: Toby J. Koktan, Nepean (CA)

(73) Assignee: Alcatel Lucent, Boulogne-Billancourt (FR)

( * ) Notice: Subject to any disclaimer, the term of this patent is extended or adjusted under 35 U.S.C. 154(b) by 229 days.

(21) Appl. No.: 13/470,833

(22) Filed: May 14, 2012

(65) Prior Publication Data

US 2013/0304983 A1 Nov. 14, 2013

(51) Int. Cl.
G06F 12/00 (2006.01)

(52) U.S. Cl.
USPC ........................................................ 711/108

(58) Field of Classification Search
USPC ........................................................ 711/108
See application file for complete search history.

(56) References Cited

U.S. PATENT DOCUMENTS

| | | | |
|---|---|---|---|
| 5,761,529 A * | 6/1998 | Raji et al. ........................ | 710/4 |
| 6,516,383 B1 * | 2/2003 | Patra et al. ..................... | 711/108 |
| 7,706,375 B2 | 4/2010 | Wisener et al. | |
| 8,539,184 B2 * | 9/2013 | Dudgeon et al. ............... | 711/165 |
| 2003/0065879 A1 * | 4/2003 | Krishna et al. ................. | 711/108 |
| 2008/0080539 A1 * | 4/2008 | Hong et al. ..................... | 370/402 |
| 2009/0119529 A1 * | 5/2009 | Kono et al. ..................... | 713/324 |
| 2010/0158016 A1 * | 6/2010 | Wisener et al. ........... | 370/395.31 |
| 2010/0169968 A1 * | 7/2010 | Shanbhogue et al. .......... | 726/22 |
| 2010/0202470 A1 * | 8/2010 | Luan ............................. | 370/412 |
| 2011/0276752 A1 * | 11/2011 | Kishore ......................... | 711/108 |
| 2012/0203708 A1 * | 8/2012 | Psota et al. .................... | 705/347 |

OTHER PUBLICATIONS

International Search Report for PCT/CA2013/050340 dated Aug. 1, 2013.

* cited by examiner

*Primary Examiner* — Charles Rones
*Assistant Examiner* — Nanci Wong
(74) *Attorney, Agent, or Firm* — Kramer Amado, P.C.

(57) ABSTRACT

Embodiments of the invention are directed to a TCAM for longest prefix matching in a routing system. The TCAM comprises a plurality of records of which a portion are configured into one or more address clusters each such cluster corresponding to a respective IP address prefix length and another portion of which are configured into a free cluster not corresponding to any IP address prefix length.

18 Claims, 5 Drawing Sheets

| | |
|---|---|
| 4K records — 202 | /32 cluster |
| 4K records — 204 | /31 cluster |
| TCAM search key (Record M) — 206 | /30 cluster |
| TCAM search key (Record M+1) — 208 | |
| TCAM search key (Record M+2) — 210 | |
| TCAM empty (Record M+3) — 212 | |
| Free Space (Empty Records) — 214 | |
| TCAM empty (Record M+4K) — 216 | |
| 4K records per cluster — 218 | /29 to /25 clusters |
| 8K records — 220 | /24 cluster |
| 4K records — 222 | /23 cluster |
| 4K records — 224 | /22 cluster |
| 1K to 4K records per cluster — 226 | /21 to /17 clusters |
| 4K records — 228 | /16 cluster |
| 256 records — 230 | /15 cluster |
| 4 to 256 records per cluster — 232 | /14 to /2 clusters |
| 4 records — 234 | /1 cluster |
| 256 records — 236 | /0 cluster |
| Free Space (10% of Total FIB Space) For dynamic cluster growth — 238 | |

DYNAMIC ALLOCATION OF RECORDS TO CLUSTERS IN A TERNARY CONTENT ADDRESSABLE MEMORY

FIELD OF THE INVENTION

The invention is directed to allocating records in a ternary content addressable memory (TCAM), specifically to dynamically allocating such records in clusters.

BACKGROUND OF THE INVENTION

TCAM hardware devices are commonly employed in today's high performance communication systems for fast routing lookups and packet classification. A TCAM search will compare the header of the incoming packet against all entries in the forwarding table or the classifier database in parallel. The lookup result is returned with a fixed latency regardless of record location and number of records in the TCAM.

For IPv4/v6 routing lookups the entries are sorted based on the address prefix lengths in the forwarding table in order to guarantee longest prefix matching (LPM). Keeping the entries sorted in the TCAM under addition and deletion of routing lookup entries is a time consuming operation, and may take N memory shift (delete & rewrite) operations in the worst case, where N is the number of prefixes in the forwarding table, e.g. 32 for IPv4 and 128 for IPv6. Keeping the TCAM entries sorted as such can delay data path forwarding of communications traffic and can cause a sustained load on system CPU resources, which has the potential to cause problems such as degrading system performance. The risk of performance degradation is especially high during bulk routing updates.

Allocating records in a TCAM to fixed size clusters, also referred to hereinafter as blocks, is known. However, selecting a suitable initial default block size may be difficult. For example, if the initial block size is too small for a particular application, the addition of all new entries in a block after the block becomes full may overburden CPU resources since move operations will be needed to insert each new entry. Furthermore, a system that is designed for several different markets and applications may have different IP route distribution requirements, which could mean a suitable "one size fits all" default block size per route prefix length is difficult to determine. Moreover, during periods where there are bulk routing updates, for example many routing table adds/deletes due to a major change in a network, the resulting extra processing could be CPU resource and time consuming if the route table grows large and several blocks associated with respective IP address prefix lengths approach and reach capacity.

Therefore an efficient approach for dynamically allocating records into blocks in a TCAM is desired.

SUMMARY

According to an aspect of the invention a TCAM for longest prefix matching is provided. The TCAM comprises: a plurality of records of which a portion are configured into one or more address clusters each such cluster corresponding to a respective IP address prefix length and another portion of which are configured into a free space cluster not corresponding to any IP address prefix length.

According to another aspect of the invention a method of dynamically allocating records to clusters in a TCAM is provided. The method includes the steps of: allocating a respective number of records to each of a plurality of clusters of a first type; allocating a number of empty records to a cluster of a second type; monitoring, for each cluster of the first type, a respective number of non-empty records; comparing, for each cluster of the first type, the respective number of non-empty records to a respective first threshold; and increasing the respective number of records allocated to a given cluster of the first type if the respective number of non-empty records of that cluster is greater than the respective first threshold of that cluster.

According to yet another aspect of the invention an apparatus configured to dynamically allocate records to clusters in a TCAM is provided. The apparatus includes: a TCAM; a memory; and a processor in communication with the TCAM and the memory. The memory has been configured with a software program comprising instructions that when executed by the processor cause the apparatus to be operable to: allocate a respective number of records to each of a plurality of clusters of a first type; allocate a number of empty records to a cluster of a second type; monitor, for each cluster of the first type, a respective number of non-empty records; compare, for each cluster of the first type, the respective number of non-empty records to a respective first threshold; and increase the respective number of records allocated to a given cluster of the first type if the respective number of non-empty records of that cluster is greater than the respective first threshold of that cluster.

Additionally or alternatively, in some embodiments of the invention allocating a respective number of records to each of a plurality of clusters of a first type comprises associating each said cluster to a respective Internet address prefix length.

Additionally or alternatively, in some embodiments of the invention allocating a number of empty records to a cluster of a second type comprises associating said cluster of the second type to a free cluster wherein records allocated thereto remain empty.

Additionally or alternatively, in some embodiments of the invention comparing comprises comparing the respective number of non-empty records to a respective first threshold that is a respective first percentage of the respective number of records allocated to the cluster of the first type. Furthermore in some embodiments comparing further comprises determining the respective first percentage in accordance with the respective Internet address prefix length associated with the cluster of the first type.

Additionally or alternatively, in some embodiments of the invention increasing comprises: decrementing the number of records allocated to the cluster of the second type by a first number of records; and incrementing the respective number of records allocated to the given cluster of the first type by the first number of records.

Additionally or alternatively, some embodiments of the invention further comprise: monitoring the number of empty records allocated to the cluster of the second type; comparing the number of empty records to a second threshold; and increasing the number of empty records allocated to the cluster of the second type if the number of empty records is less than the second threshold. Furthermore, in some embodiments of the invention increasing the number of empty records allocated to the cluster of the second type comprises: comparing, for one or more clusters of the first type, the respective number of non-empty records to a respective third threshold; reducing the respective number of records allocated to a particular cluster of the first type by a second number of records if the respective number non-empty records of that cluster is less than the respective third threshold of that cluster; and increasing the number of empty records allocated to the cluster of the second type by the second number of records. Moreover, some embodiments of the invention further comprise repeating the steps of: monitoring the number of empty records allocated to the cluster of the second type; comparing the number of empty records to a second threshold; and increasing the number of empty records allocated to the cluster of the second type, until the number of empty records allocated to the cluster of the second type is greater than or equal to the second threshold.

Advantageously, some embodiments of the invention provide enhanced performance for high-capacity scaled IP routing networking products.

Advantageously, some embodiments of the invention ameliorate the problem that a suitable "one size fits all" default block size per route prefix length is difficult to determine in that they enable growing/shrinking of TCAM clusters on demand based on specific requirements. In some cases, new records may be able to be inserted into a TCAM without any move operations when new routes are learned.

Advantageously, some embodiments of the invention may utilize idle central processing unit (CPU) resources by executing some or all of the aforementioned method steps in a background process as opposed to trying to keep TCAM entries updated and sorted at the time a new routing entry is being learned by a routing system that employs the embodiment.

Advantageously, some embodiments of the invention when employed in a routing system may reduce the overall average route addition time thereby freeing up processing resources that may be critically needed during bulk route updates, e.g. due to a major network change.

BRIEF DESCRIPTION OF THE DRAWINGS

The foregoing and other objects, features and advantages of the invention will be apparent from the following more particular description of the preferred embodiments, as illustrated in the appended drawings, where:

FIG. 2 depicts an allocation of records to clusters in a TCAM resulting from implementation of the method depicted in FIG. 1.

In the figures like features are denoted by like reference characters.

DETAILED DESCRIPTION

Figure 1:
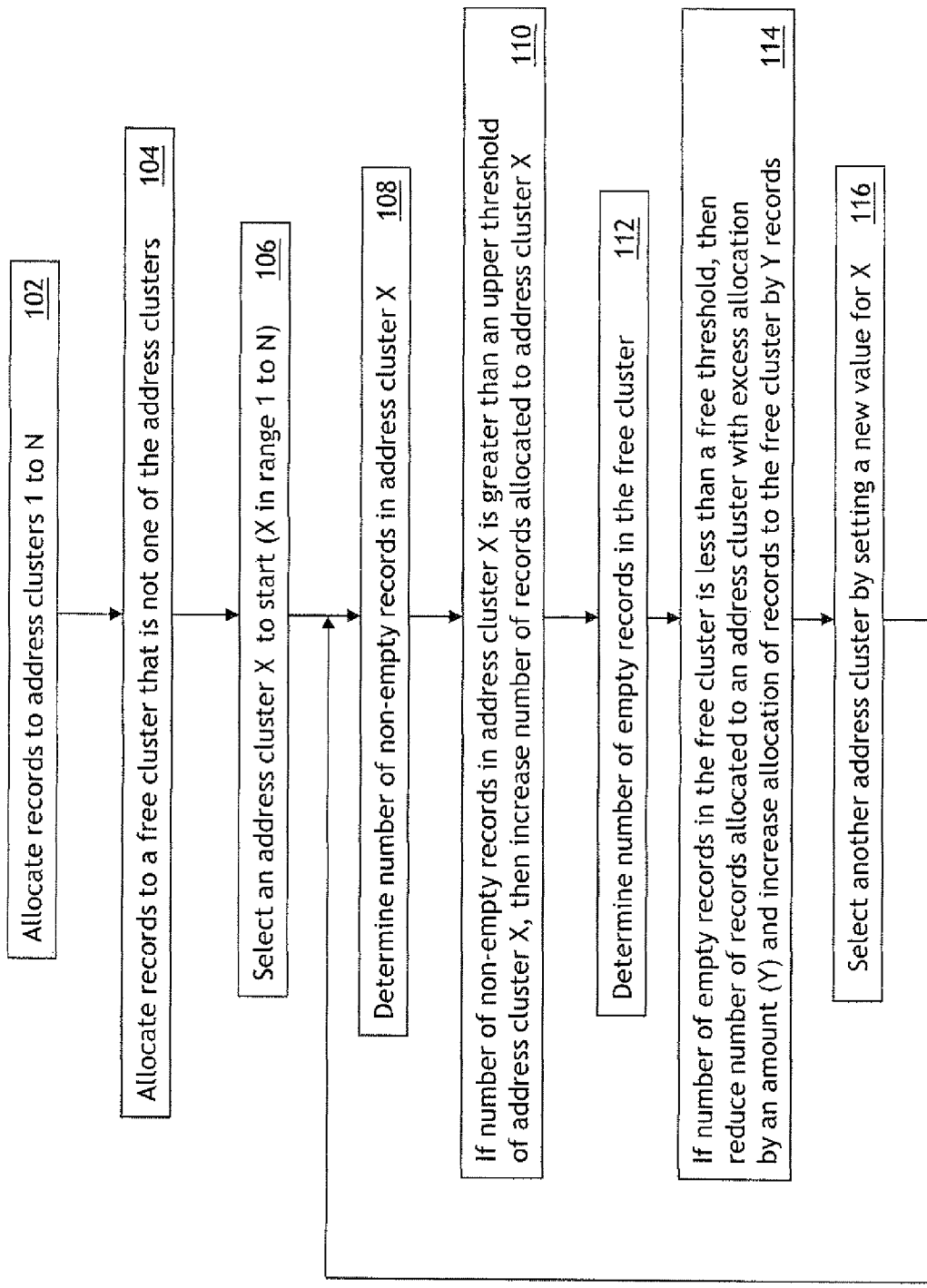
FIG. 1 depicts a method of dynamically allocating records to clusters in a TCAM according to a first embodiment of the invention.

Embodiments of the invention can be used in a TCAM IPv4/v6 LPM dynamic cluster resizing software process. As such, IPv4/v6 record clusters based on prefix length are created as partitions across a portion of the TCAM memory space. The default sizes of the clusters themselves are defined based on typical route distributions in forwarding information databases of some sample router deployments. This default size definition reduces but does not eliminate the possibility of a cluster becoming full, i.e. with no space left to add/insert a new record. Clusters are maintained with free space in the form of empty records at the end of the cluster. Since there is no order dependency for records in a prefix length cluster, as long as there is free space in a cluster a new record entry can be programmed simply and instantly without any move operations, thereby providing fast insertion time for the record.

The dynamic cluster resizing process may be executed as a background software process during CPU idle periods of which there can be a considerable number during steady state operation of a routing system deployed in a communications network. Re-capturing some of this available CPU time during idle periods and using it for TCAM LPM sorting and dynamic resizing operations makes efficient use of CPU resources. Exceptions to available CPU idle time typically occur during system boot-up and initial configuration, as well as during large scale network events such as bulk route updates to re-route traffic flows for high-availability of communications services.

Since deployments and their associated route distributions in a TCAM are typically different, predicting which clusters might become full and require extra space is difficult. By reserving what is referred to herein as a "free space" cluster (also free cluster and empty cluster) at the end of the TCAM address space there is room to grow any cluster which is approaching its default cluster size limit. The size of the free space cluster could for example be 10% of the total TCAM capacity. Conversely, clusters that are sized too large and therefore may be inefficiently using TCAM space can be shrunk by moving a portion of empty cluster space (i.e. empty or unused records) to the free space cluster; thereby reclaiming that space for use in growing other clusters as needed.

As part of the dynamic cluster resizing process, a background software process may be run periodically to detect clusters approaching capacity and invoke a process which dynamically increases size where needed and decreases sizes for large underutilized clusters. The process would detect clusters that are becoming full (e.g. at greater than 75% of their allocated record size) in the background and initiate a process that dynamically increases the size of such clusters to ensure they have sufficient free space to add new entries, for example when new route updates must be made.

Aside from when the route table is fully populated, the process of learning/computing new routes is often paced giving software a chance to reorganize the TCAM for fast insertion before the routes are downloaded. If a batch of routing updates arrives all at once thereby filling a cluster before idle CPU cycles are available, the software process will remedy the full cluster situation by adding space to the cluster sometime later so that future additions to this cluster will not require moving entries. The process claims room from the free space cluster and begins shifting all records down until it reaches the cluster that needs to increase in size. The worst case scenario would be growing the /32 or /128 (IPv4 or IPv6 respectively) cluster which would result in the maximum number of move operations. However, outside of a bulk update period there are typically plenty of free CPU cycles available. If necessary, the work to reorganize the TCAM can be broken into small operations making use of what would otherwise be idle CPU processing cycles.

Another function of the dynamic cluster resizing process is monitor the number of empty records (free space) in the free space cluster to ensure that its size remained at a certain preselected percentage (e.g. 10%) of the total TCAM size. Therefore, as soon as a cluster growth operation has occurred, one or more shrink operations would be invoked to reclaim unused cluster space and bring it back to the free space cluster for use to grow other clusters as needed. Example criteria for such cluster shrink operations include: unused space of cluster>512 records, cluster is <25% utilized, or cluster has been involved in the least number of previous shrink operations compared to other cluster (except the free space cluster). The latter criterion is aimed at providing even shrinkage of all clusters that are sized too large.

In some TCAM applications, the cluster grow/shrink operations might only occur a few times especially when route distribution of a particular deployment is not likely to change drastically over time. As the dynamic cluster resizing process works in the background to adjust the TCAM record allocation to the customer's route table distribution, the possibility of time consuming TCAM entry move operations occurring during periods of critical network updates is reduced. Furthermore, the dynamic cluster resizing process should help improve TCAM performance by ensuring the fastest possible (i.e. no record moves) speed of updates into the data path and reduce the overall average route record insertion time into the TCAM device throughout operation of the router.

Implementations of the dynamic cluster resizing process may include two separate functions, those being a first function used to grow or increase the size of a cluster in a TCAM, and a second function used to shrink or decrease the size of a cluster in a TCAM. The first function is referred to herein as "GrowIPClusterUpIntoAdjacentFreeSpace" while the second function is referred to herein as "GrowIPClusterDownIntoAdjacentFreeSpace".

The following example illustrates how the functions are used. Suppose a dynamic cluster grow operation of amount X records for the cluster with prefix length=N is required by the dynamic cluster resizing process. The process would execute the following steps:

1) Grow the /0 prefix cluster down X records into the free space cluster at the top (i.e. highest address) of free space cluster TCAM address space
2) Next, successively move higher one cluster at a time (one higher in prefix length) on clusters 1, 2 . . . N in TCAM address space and grow that cluster down X records using GrowIPClusterDownIntoAdjacentFreeSpace, where growing a cluster down involves rolling entries down at the top of a given cluster thereby creating free space in the next higher cluster (one higher in prefix length). To reduce the number of entries moved it should be noted that the entries are not shifted down, which even to shift by one record would require moving all entries by one position, but instead as many entries as needed to effect creation of the desired amount of free space are moved directly from their position at the top (highest address) of the given cluster to a position adjacent to the entry in the bottom (lowest address) of the cluster. Since the address prefixes are not sorted within a cluster, rolling entries in this manner can be employed to move the entries as necessary instead of merely shifting entries, which would be less efficient.

The end result is that X records of free space are now transferred to cluster N while maintaining an LPM organization across the TCAM clusters.

The following example further illustrates how the functions are used. Suppose a dynamic cluster shrink operation of amount X records for the cluster with prefix length=N is required by the dynamic cluster resizing process. The process would execute the following steps:

1) Start at cluster=N and grow that cluster up by X records using GrowIPClusterUpIntoAdjacentFreeSpace 2) Next, successively move downward one cluster at a time in TCAM address space (i.e. decreasing prefix lengths) and grow that cluster up by X records using GrowIPClusterUpIntoAdjacentFreeSpace until the /0 cluster is reached, where growing a cluster up involves rolling entries from the bottom (i.e. lowest address) of the cluster to the top (i.e. highest address) of the cluster, which frees space in the cluster below the current cluster.
3) Finally transfer the block of space X back into the free space cluster by growing the free space cluster up into the /0 cluster.

The end result is that X records of free space from cluster N have been transferred back to the free space cluster, which can be used in the future to increase the size other clusters as needed.

FIG. 1 depicts a method 100 of dynamically allocating records to clusters in a TCAM according to a first embodiment of the invention. Generally, the TCAM is partitioned into a plurality of address clusters, each such cluster corresponding to an IP address prefix length, and a free cluster. The method begins by allocating 102 a respective number of records to each of the address clusters (1 to N) in the TCAM. Execution of the method 100 continues by allocating 104 a number of records to the free cluster, where the free cluster is not one of the address clusters. These first two allocating steps 102, 104 could be done in any order to effect the aforementioned partitioning. Typically, the number of records allocated to each of the address cluster will vary with the application in which the TCAM is to be used. The number of records allocated to the free cluster would typically be 10% of the capacity in records on the TCAM, but this amount could also vary with the intended use of the TCAM. An example configuration of a TCAM will be described later in more detail with reference to FIG. 2.

The method 100 continues by selecting 106 an address cluster (e.g. X, X in the range 1 to N) to start a series of steps that will be executed repeatedly to accomplish the dynamic allocation, in fact reallocation and adjustment, of records to clusters in the TCAM. The method continues by determining 108 the number of non-empty records in the selected address cluster X. A non-empty record is one that has an entry in it such as an IP address prefix. The method 100 proceeds to determining 110 if the number of non-empty records in the selected address cluster X is greater than an upper threshold of the selected address cluster X, and if so, then increasing 110 the number of records allocated to the selected address cluster X. An example upper threshold is 75% of the records allocated to the selected address cluster X. The method 100 continues by determining 112 the number of empty records in the free cluster. An empty record is a record without any entry in it. The method 100 proceeds to determining 114 if the number of empty records in the free cluster is less than a free threshold, and if so, reducing 114 the number of records allocated to an address cluster with excess allocation by an amount (Y) and increasing 114 allocation of records to the free cluster by the same amount Y. An example free threshold is 10% of the records in the TCAM, i.e. 10% of the full size of the TCAM. An example amount Y records is 512 records, however this amount could vary with the intended application in which the TCAM will be deployed. The method 100 continues by selecting 116 another address cluster by setting a new value for X and repeating the aforementioned steps starting at determining 108 the number of non-empty records in the selected address cluster X.

FIG. 2 depicts an allocation of records to clusters in a TCAM 200 resulting from implementation of the method depicted in FIG. 1. The TCAM address clusters are sorted by descending prefix length. Hereinafter, naming of the address clusters follows a pattern of /#, where # denotes the number of bits in the address prefixes that will be stored in that address cluster. The maximum prefix length for IPv4 is 32 bits, and prefixes of that length will be stored in a /32 address cluster 202, which has 4 K (4096) records allocated to it. Similarly, a /31 address cluster 204 for storing 31 bit IP address prefixes also has 4 K records allocated to it. A /30 address cluster also has 4 K records assigned to it and is shown in more detail as including: a TCAM search key (record M) 206, a TCAM search key (record M+1) 208, a TCAM search key (record M+2) 210, a TCAM empty record (record M+3) 212, free space (empty records) 214, and a TCAM empty record (record M+4 K) 216. The TCAM 200 also includes: /29 to /25 address clusters 218 having 4 K records per cluster, a /24 address cluster 220 having 8 K (8192) records, a /23 address cluster 222 having 4 K records, a /22 address cluster 224 having 4 K records, /21 to /17 address clusters 226 having anywhere from 1 K to 4 K records per cluster, a /16 address cluster 228 having 4 K records, a /15 address cluster 230 having 256 records, /14 to /2 address clusters 232 having a range of 4 to 256 records allocated per cluster, a /1 address cluster 234 having 4 records, and a /0 address cluster 236 having 256 records. The TCAM 200 also includes a free space cluster 238 that has 10% of the total TCAM records allocated to it and which is used for dynamically growing the address clusters 202 to 236 as needed.

Figure 3:
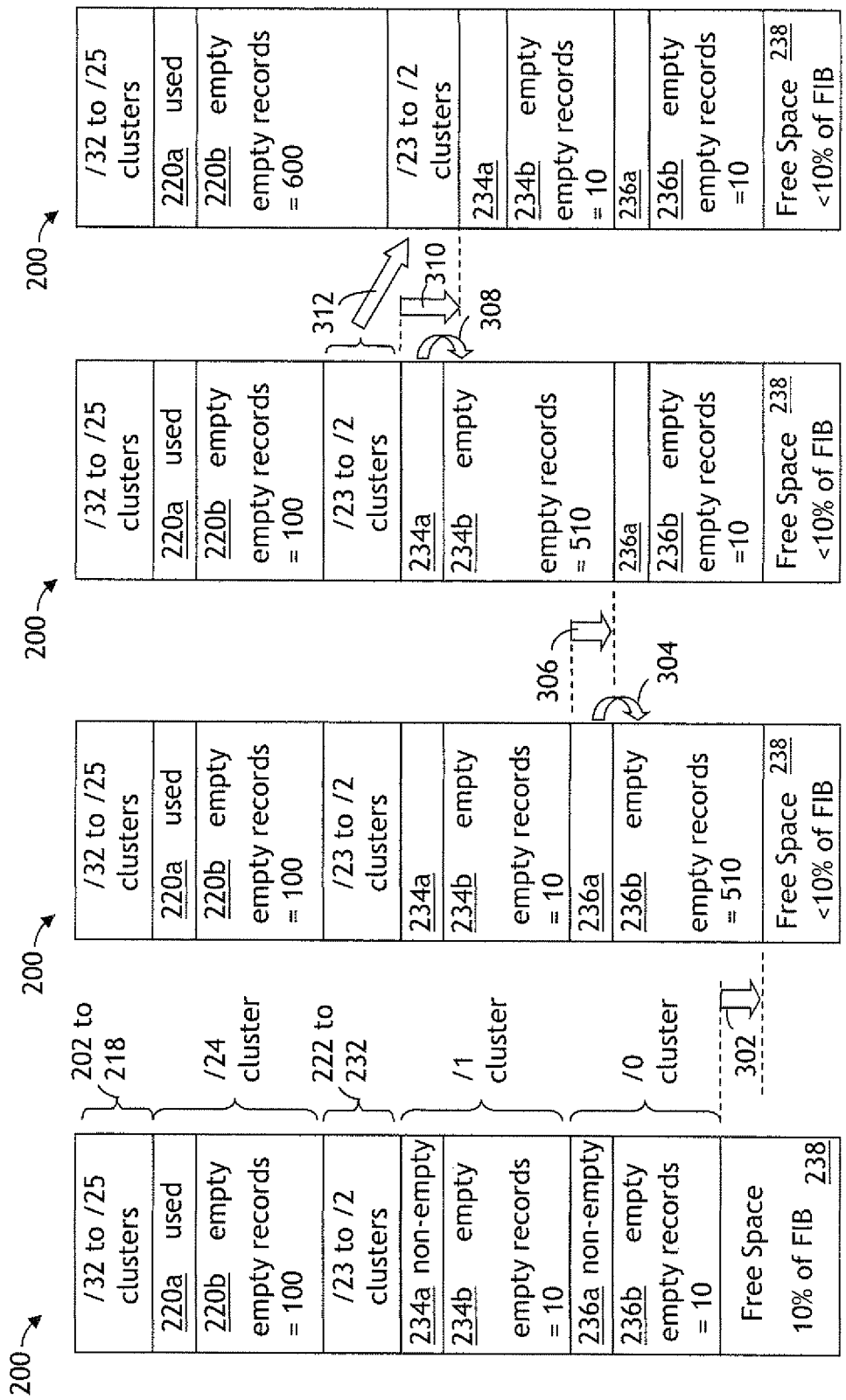
FIG. 3 depicts a dynamic cluster grow operation being performed on the TCAM of FIG. 2 in accordance with the first embodiment of the invention.

FIG. 3 depicts a dynamic cluster grow operation 300 being performed on the /24 address cluster 220 of the TCAM 200 of FIG. 2 in accordance with the first embodiment of the invention. The grow operation 300 will add 500 empty records to the /24 address cluster 220; thereby increasing the total number of records allocated to that cluster. The /24 address cluster 220 is shown in more detail as comprising used (or non-empty) records 220a and empty records 220b, the latter of which there are 100 records. Likewise, the /1 address cluster 234 is shown in more detail as comprising used records 234a and empty records 234b, the latter of which there are 10 records. Similarly, the /0 address cluster 236 is shown in more detail as comprising used records 236a and empty records 236b, the latter of which there are 10 records. The free space cluster 238 has 10% of the total TCAM records allocated to it, shown here as 10% of the Forwarding Information Base (FIB).

The first step of the dynamic cluster grow operation 300 is to increase 302 the number of records allocated to the /0 address cluster 236 by 500 empty records; thereby causing the total number of empty records 236b in that cluster to be 510. These 500 records are obtained from the free space cluster 238 at the top (highest address) of the free space cluster 238. The non-empty (or used/occupied) records 236a in the /0 address cluster 236 are rolled down 304 from the top of the /0 address cluster 236, in a manner described earlier in connection with the explanation of the "GrowIPCluster-DownIntoAdjacentFreeSpace" function; thereby increasing 306 the number of empty records 234b in the /1 address cluster 234 to 510 records. The non-empty records 234a in the /1 address cluster 234 are rolled down 308 from the top of the /1 address cluster 236, in the same manner as was done with the non-empty records 236a in the /0 address cluster 236. Similar rolling down operations 312 to those just performed on the /0 and /1 address clusters 236, 234 are performed on the /2 to /23 clusters 232-222; thereby causing 500 empty records to be added to the empty records 220b of the /24 address cluster 220. The end result is that the number of empty records 220b in the /24 address cluster 220 increased from 100 records to 600 records, which represents an increase of 500 records allocated to the /24 address cluster 220.

Figure 4:
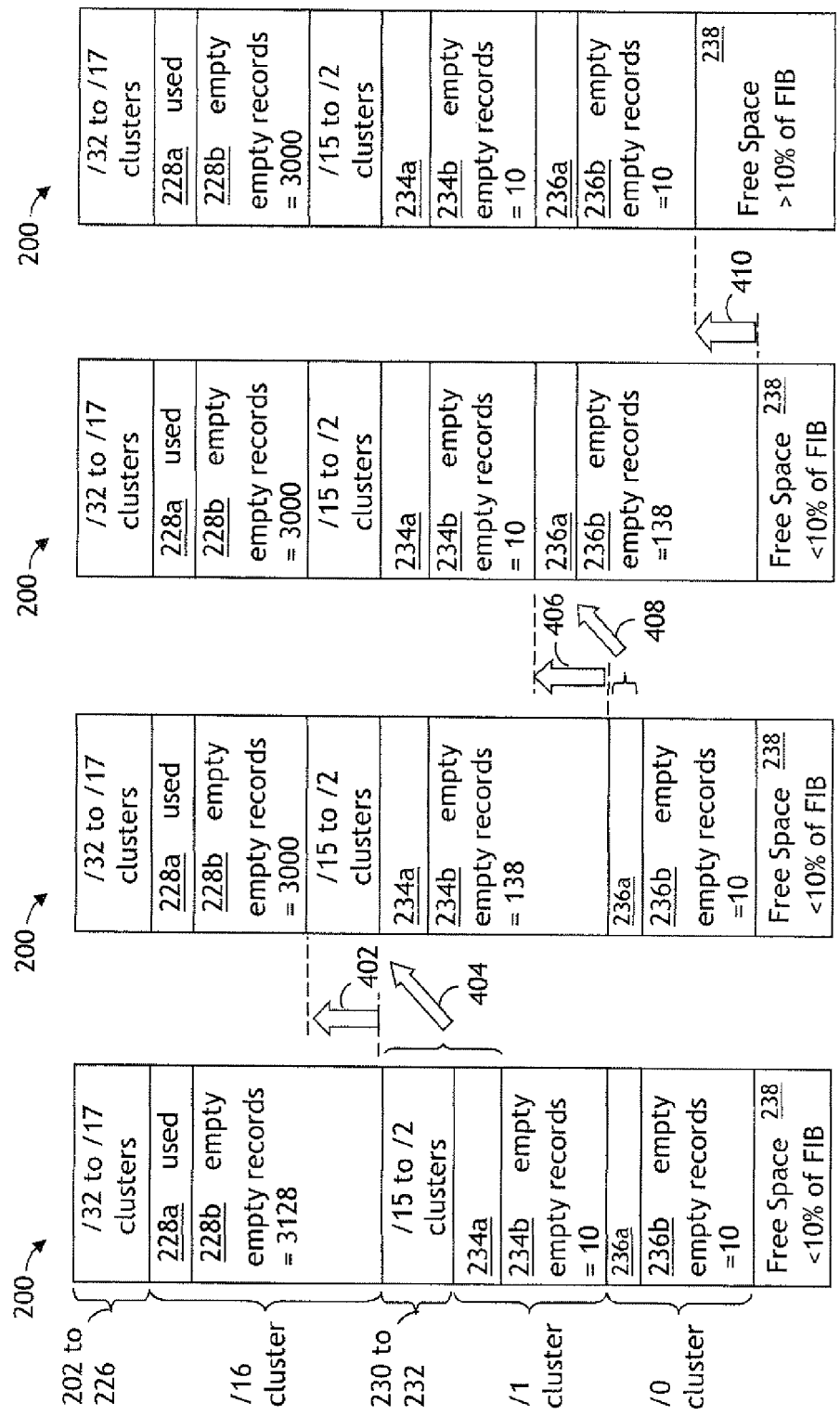
FIG. 4 depicts a dynamic cluster shrink operation being performed on the TCAM of FIG. 2 in accordance with the first embodiment of the invention.

FIG. 4 depicts a dynamic cluster shrink operation 400 being performed on the /16 address cluster 228 of the TCAM 200 of FIG. 2 in accordance with the first embodiment of the invention. The shrink operation 400 will remove 128 empty records from the /16 address cluster 228; thereby decreasing the total number of records allocated to that cluster. The /16 address cluster 228 is shown in more detail as comprising used records 228a and empty records 228b, the latter of which there are 3128 records. Likewise, the /1 address cluster 234 is shown in more detail as comprising used records 234a and empty records 234b, the latter of which there are 10 records. Similarly, the /0 address cluster 236 is shown in more detail as comprising used records 236a and empty records 236b, the latter of which there are 10 records. The free space cluster 238 has slightly less than 10% of the total TCAM records allocated to it, shown here as <10% of the Forwarding Information Base (FIB).

The first step of the dynamic cluster shrink operation 400 is to decrease 402 the number of records allocated to the /16 address cluster 228 by 128 empty records; thereby causing the total number of empty records 228b in that cluster to be 3000. This is done by successively rolling up non-empty records by 128 TCAM record positions one cluster at a time from the /15 to /2 address clusters 230-232 in a manner described earlier in connection with the explanation of the "GrowIPClusterUpIntoAdjacentFreeSpace" function; thereby increasing 404 the number of empty records 234b in the /1 address cluster 234 to 138 records. The non-empty records 236a in the /0 address cluster 236 are rolled up 408 from the top of the /0 address cluster 236, in a manner described earlier in connection with the explanation of the "GrowIPClusterUpIntoAdjacentFreeSpace" function; thereby decreasing 406 the number of empty records 234b in the /1 address cluster 234 to 10 records. The empty records 236b in the /0 address cluster 236 is now 138 records. Finally, the number of records allocated to the free space cluster 238 is increased by 128 empty records obtained from the bottom (lowest address) of the /0 address cluster 236; thereby causing the free space cluster 238 to have allocated to it a number of records equal to approximately 10% of the total number records in the TCAM 200.

Figure 5:
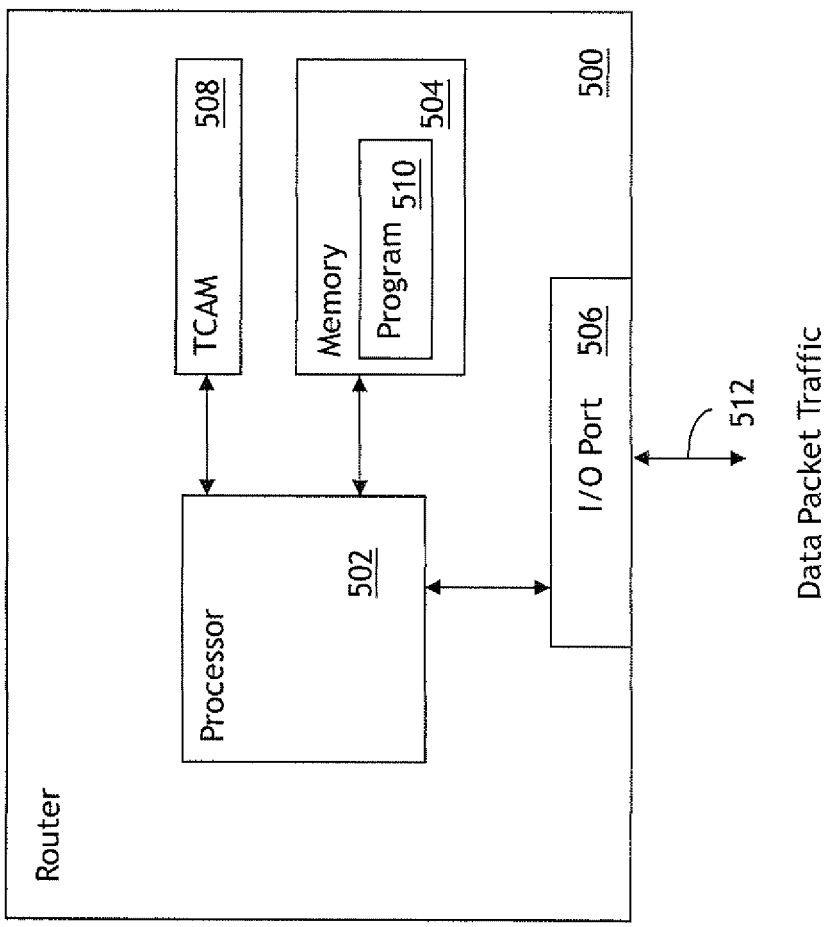
FIG. 5 depicts an apparatus for performing the method depicted in FIG. 1 according to a second embodiment of the invention.

FIG. 5 depicts an apparatus 500 for performing the method depicted in FIG. 1 according to a second embodiment of the invention. For example the apparatus 500 could be a router. The apparatus includes a processor 502, a memory 504 that is in communication with the processor 502, a input/output (I/O) port 506 that is in communication with the processor 502, and a TCAM 508 that is also in communication with the processor 502. The memory includes a program 510 that has instructions which when executed by the processor cause the method 200 and associated dynamic cluster grow and shrink operations 300, 400 previously described to be performed on the TCAM 508. The processor 502 in conjunction with the TCAM 508 enables the apparatus 500 to effect LPM operations on data packet traffic 512 communicated over the I/O port 506.

Numerous modifications, variations and adaptations may be made to the embodiments of the invention described above without departing from the scope of the invention, which is defined in the claims.

What is claimed is:

1. A method of dynamically allocating records to a plurality of clusters in a Ternary Content Addressable Memory (TCAM), the method comprising:

allocating a respective number of records to each of the plurality of clusters of a first type;

allocating a number of empty records to a cluster of a second type;

monitoring, for each cluster of the first type, a respective number of non-empty records;

comparing, for each cluster of the first type, the respective number of non-empty records to a respective first threshold; and increasing the respective number of records allocated to a given cluster of the first type when the respective number of non-empty records of that cluster is greater than the respective first threshold of that cluster by progressively rolling down the non-empty records in an iterative manner a. by decrementing the number of records allocated to the cluster of the second type by a first plurality records; and incrementing the respective number of records allocated to the given cluster of the first type by the first plurality records.

2. The method of claim 1, wherein allocating the respective number of records to each of the plurality of clusters of the first type further comprises:

associating each said cluster to a respective Internet address prefix length.

3. The method of claim 1, wherein allocating the number of empty records to the cluster of the second type further comprises:

associating said cluster of the second type to a free space cluster, wherein records allocated thereto remain empty.

4. The method of claim 2, wherein the comparing step further comprises:

comparing the respective number of non-empty records to a respective first threshold that is a respective first percentage of the respective number of records allocated to the cluster of the first type.

5. The method of claim 4, wherein the comparing step further comprises:

determining the respective first percentage in accordance with the respective Internet address prefix length associated with the cluster of the first type.

6. The method of claim 1, further comprising:

monitoring the number of empty records allocated to the cluster of the second type;

comparing the number of empty records to a second threshold; and increasing the number of empty records allocated to the cluster of the second type if the number of empty records is less than the second threshold.

7. The method of claim 6, wherein increasing the number of empty records allocated to the cluster of the second type further comprises:

comparing, for one or more clusters of the first type, the respective number of non-empty records to a respective third threshold;

reducing the respective number of records allocated to a particular cluster of the first type by a second number of records if the respective number of non-empty records of that cluster is less than the respective third threshold of that cluster; and increasing the number of empty records allocated to the cluster of the second type by the second number of records.

8. The method of claim 7, further comprising, repeating the steps of:

monitoring the number of empty records allocated to the cluster of the second type;

comparing the number of empty records to a second threshold; and increasing the number of empty records allocated to the cluster of the second type, until the number of empty records allocated to the cluster of the second type is greater than or equal to the second threshold.

9. An apparatus configured to dynamically allocate records to a plurality of clusters in a Ternary Content Addressable Memory (TCAM), comprising:

a T CAM;

a memory;

a processor in communication with the TCAM and the memory, wherein the memory has been configured with a software program comprising instructions that when executed by the processor cause the apparatus to be configured to:

allocate a respective number of records to each of the plurality of clusters of a first type, allocate a number of empty records to a cluster of a second type, monitor, for each cluster of the first type, a respective number of non-empty records, compare, for each cluster of the first type, the respective number of non-empty records to a respective first threshold, and increase the respective number of records allocated to a given cluster of the first type when the respective number of non-empty records of that cluster is greater than the respective first threshold of that cluster by progressively rolling down the non-empty records in an iterative manner by decrementing the number of records allocated to the cluster of the second type by a first plurality records; and incrementing the respective number of records allocated to the given cluster of the first type by the first plurality records.

10. The apparatus of claim 9, wherein the apparatus is further configured to allocate the respective number of records to each of the plurality of clusters of the first type by associating each said cluster to a respective Internet address prefix length.

11. The apparatus of claim 9, wherein the apparatus is further configured to allocate the number of empty records to the cluster of the second type by associating said cluster of the second type to a free cluster wherein records allocated thereto remain empty.

12. The apparatus of claim 10, wherein the apparatus is further configured to compare the respective number of non-empty records to a respective first threshold that is a respective first percentage of the respective number of records allocated to the cluster of the first type.

13. The apparatus of claim 12, wherein the apparatus is further configured to determine the respective first percentage in accordance with the respective Internet address prefix length associated with the cluster of the first type.

14. The apparatus of claim 9, wherein the apparatus is further configured to:

monitor the number of empty records allocated to the cluster of the second type, compare the number of empty records to a second threshold, and increase the number of empty records allocated to the cluster of the second type if the number of empty records is less than the second threshold.

15. The apparatus of claim 14, wherein the apparatus is further configured to:

compare, for one or more clusters of the first type, the respective number of non-empty records to a respective third threshold, reduce the respective number of records allocated to a particular cluster of the first type by a second number of records if the respective number non-empty records of that cluster is less than the respective third threshold of that cluster, and increase the number of empty records allocated to the cluster of the second type by the second number of records.

16. The apparatus of claim 15, wherein the apparatus is further configured to repeat the steps of:

monitoring the number of empty records allocated to the cluster of the second type, comparing the number of empty records to a second threshold, and increasing the number of empty records allocated to the cluster of the second type, until the number of empty records allocated to the cluster of the second type is greater than or equal to the second threshold.

17. The apparatus of claim 9, wherein the apparatus is further configured to execute the software program as a background task by utilizing normally idle execution cycles of the processor.

18. The apparatus of claim 9, further comprising:

a port configured to communicate data packet traffic from a communication network, wherein the port is in communication with the processor and the processor has been configured to perform longest prefix matching on addresses contained in the headers of data packet traffic by utilizing the TCAM.

* * * * *